(12) United States Patent
Choi

(10) Patent No.: US 7,942,440 B2
(45) Date of Patent: May 17, 2011

(54) CHANNEL AND DIFFUSER AIRBAG

(75) Inventor: Changsoo Choi, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 423 days.

(21) Appl. No.: 11/316,233

(22) Filed: Dec. 22, 2005

(65) Prior Publication Data

US 2007/0145730 A1 Jun. 28, 2007

(51) Int. Cl.
*B60R 21/2334* (2006.01)
(52) U.S. Cl. .................. 280/740; 280/729; 280/732
(58) Field of Classification Search .................. 280/729, 280/730.1, 732, 740, 736
See application file for complete search history.

(56) References Cited

U.S. PATENT DOCUMENTS

| | | | | |
|---|---|---|---|---|
| 4,290,627 | A | * | 9/1981 | Cumming et al. ............ 280/729 |
| 4,300,894 | A | * | 11/1981 | Cumming et al. ............ 493/210 |
| 5,240,283 | A | * | 8/1993 | Kishi et al. .................... 280/729 |
| 5,464,250 | A | * | 11/1995 | Sato ............................. 280/743.1 |
| 5,529,337 | A | * | 6/1996 | Takeda et al. ................. 280/729 |
| 5,573,270 | A | * | 11/1996 | Sogi et al. ..................... 280/740 |
| 5,797,621 | A | * | 8/1998 | Ono .............................. 280/730.2 |
| 6,155,595 | A | * | 12/2000 | Schultz ......................... 280/729 |
| 6,270,113 | B1 | * | 8/2001 | Wipasuramonton et al. ............................ 280/730.2 |
| 6,371,518 | B1 | * | 4/2002 | Kalandek et al. ........... 280/743.1 |
| 6,382,662 | B1 | * | 5/2002 | Igawa ........................... 280/729 |
| 6,419,267 | B1 | * | 7/2002 | Hashimoto et al. ........ 280/743.1 |
| 6,585,290 | B2 | * | 7/2003 | Pinsenschaum et al. ..... 280/740 |
| 6,648,366 | B2 | * | 11/2003 | Dillon et al. .................. 280/729 |
| 6,685,217 | B2 | * | 2/2004 | Abe .............................. 280/730.1 |
| 6,802,528 | B2 | * | 10/2004 | Short et al. ................... 280/728.3 |
| 6,827,368 | B2 | * | 12/2004 | Jang et al. ..................... 280/729 |
| 6,834,884 | B2 | * | 12/2004 | Gu ................................ 280/729 |
| 6,846,014 | B2 | | 1/2005 | Rink et al. |
| 6,916,039 | B2 | * | 7/2005 | Abe .............................. 280/729 |
| 6,926,303 | B2 | * | 8/2005 | Fischer et al. ................ 280/729 |
| 7,322,599 | B2 | * | 1/2008 | Abe et al. ..................... 280/730.1 |
| 7,347,444 | B2 | * | 3/2008 | Wheelwright ............... 280/729 |
| 7,350,801 | B2 | * | 4/2008 | Nakayama ................. 280/730.1 |
| 2001/0028162 | A1 | | 10/2001 | Takimoto et al. ............ 280/731 |

(Continued)

FOREIGN PATENT DOCUMENTS

EP 0952043 10/1999

(Continued)

OTHER PUBLICATIONS

International Search Report Dated Aug. 15, 2007 in International Application No. PCT/US2006/46063, which claimed priority to U.S. Appl. No. 11/316,233, now abandoned. (9 pgs.).

*Primary Examiner* — Toan C To
*Assistant Examiner* — Barry Gooden, Jr.
(74) *Attorney, Agent, or Firm* — Sally J. Brown; Stoel Rives LLP

(57) ABSTRACT

Disclosed are embodiments of airbag cushions including diffuser panels to redirect inflation gas within the cushion. In an embodiment particularly suited for use as a knee airbag cushion, a diffuser panel is positioned over the inflator opening and in between the front and rear faces of an airbag cushion panel. The diffuser panel defines a plurality of channels such that, upon inflation of the airbag cushion through the inflator opening, the channels redirect inflation gas towards the top corners and sides of the interior of the airbag cushion.

12 Claims, 3 Drawing Sheets

U.S. PATENT DOCUMENTS

| | | | |
|---|---|---|---|
| 2002/0067032 A1* | 6/2002 | Ishikawa | 280/743.1 |
| 2002/0171230 A1 | 11/2002 | Takimoto et al. | 280/730.1 |
| 2003/0006587 A1* | 1/2003 | Jang et al. | 280/730.2 |
| 2003/0107205 A1 | 6/2003 | Gu | 280/729 |
| 2003/0193174 A1* | 10/2003 | Abe | 280/730.1 |
| 2004/0113399 A1* | 6/2004 | Yoshikawa et al. | 280/730.1 |
| 2005/0006880 A1 | 1/2005 | Nakayama | |
| 2005/0057028 A1 | 3/2005 | Hayakawa | |
| 2005/0189741 A1* | 9/2005 | Abe et al. | 280/730.1 |
| 2005/0194769 A1* | 9/2005 | Abe | 280/729 |
| 2006/0006633 A1* | 1/2006 | Bito | 280/740 |
| 2006/0131846 A1* | 6/2006 | Abe | 280/729 |
| 2006/0232049 A1* | 10/2006 | Abe | 280/729 |
| 2007/0045997 A1* | 3/2007 | Abe et al. | 280/729 |
| 2007/0090632 A1* | 4/2007 | Kashiwagi | 280/730.1 |
| 2007/0182134 A1* | 8/2007 | Mizuno et al. | 280/730.1 |
| 2007/0200321 A1* | 8/2007 | Heitplatz et al. | 280/730.1 |
| 2007/0262570 A1* | 11/2007 | Choi | 280/729 |
| 2007/0278774 A1* | 12/2007 | Ishiguro et al. | 280/740 |

FOREIGN PATENT DOCUMENTS

| | | |
|---|---|---|
| JP | 1247242 | 10/1989 |

* cited by examiner

CHANNEL AND DIFFUSER AIRBAG

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

Described below are embodiments of an automotive airbag cushion including a diffuser panel used to channel air to desired locations within the airbag. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

In one embodiment of the invention, an airbag cushion is provided which includes a front face and a rear face. The rear face has an inflator opening, over which a diffuser panel is positioned in between the front and rear faces. The diffuser panel defines a plurality of channels such that, upon inflation of the airbag cushion through the inflator opening, the channels direct inflation gas towards the top corners of the interior of the airbag cushion and towards the sides of the interior of the airbag cushion. This embodiment may be, but need not be, used as a knee airbag. In knee airbag embodiments having the above-described features, the diffuser panel may provide for an upward cushion trajectory, thereby inserting the airbag cushion into the gap between the occupant's knee and the instrument panel of the vehicle.

Figure 1:
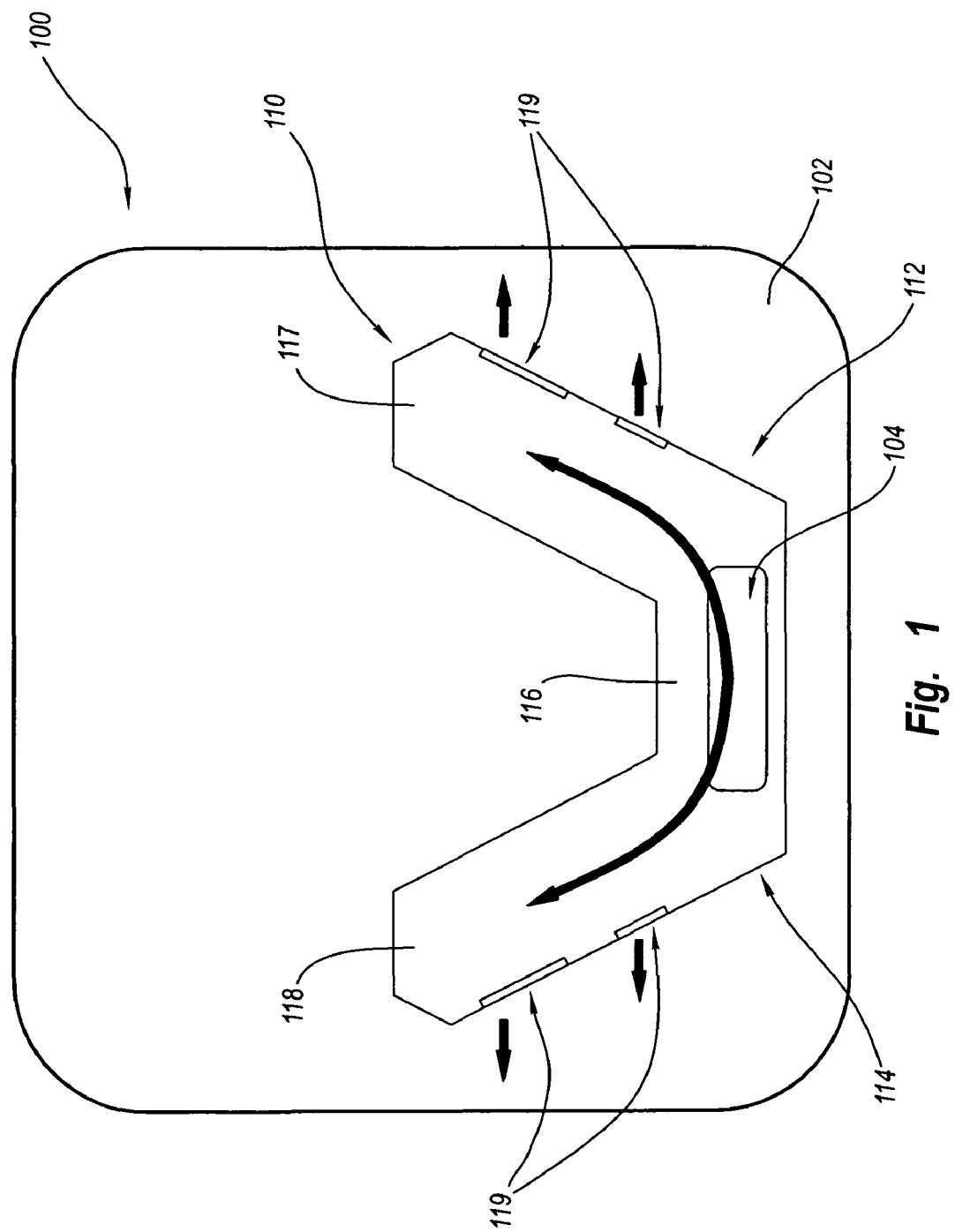
FIG. 1 is a top plan view showing an embodiment of an airbag cushion including a diffuser panel.

With reference now to the accompanying figures, particular embodiments of the invention will be described in greater detail. FIG. 1 depicts the interior of an airbag cushion 100. Airbag cushion 100 has a diffuser panel 110 sewn to the interior surface of panel 102. Diffuser panel 110 consists of two layers of material attached together along portions of their respective peripheries. Diffuser panel 110 is attached to panel 102 such that it is positioned over inflator opening 104, which is formed in panel 102. An opening in the bottom layer of diffuser panel 110 may be formed to correspond with inflator opening 104 and thereby allow inflation gas to be redirected by diffuser panel 110. The bottom layer of diffuser panel 110 may also be attached to panel 102 along the periphery of the opening coincident with inflator opening 104 in some embodiments.

Diffuser panel 110 redirects inflation gas in opposite directions along two channels, both of which begin around the center of the inflator opening 104. Channel 112 directs inflation gas towards the right and channel 114 directs inflation gas towards the left (from the perspective of FIG. 1). Channels 112 and 114 are defined by three channel portions. A first elongated channel portion 116 extends over the inflator opening 104. Both channel 112 and channel 114 include a portion of first elongated channel portion 116. A second elongated channel portion 117 extends at an angle from one end of the first elongated channel portion 116 and forms the remainder of channel 112. A third elongated channel portion 118 extends at an angle from the other end of the first elongated channel portion 116 and forms the remainder of channel 114. As can be seen from the figure, the diffuser panel forms a substantially U-shaped configuration with the first channel portion 116 forming the base and the second and third channel portions, 117 and 118, respectively, forming the sides.

As can be seen in the embodiment show in FIG. 1, the inflation gas initially directed towards the top corners of the interior of the airbag cushion 100 remains within the channels. In other embodiments, the diffuser panel may include one or more openings terminating at the end of each of the two channels to further direct inflation gas towards the top corners of the interior of the airbag cushion. Vent openings 119 in the depicted embodiment are formed in second channel portion 117 and third channel portion 118, so as to direct inflation gas towards the sides of the interior of the airbag cushion. Whereas the depicted embodiment includes two vent openings on either channel, any number of vent openings fewer or greater than the number shown in this embodiment may be provided. By directing inflation gas towards the top corners and sides of the interior of the airbag cushion 100, this configuration also provides for an inflation attribute wherein a central region of the interior of the airbag cushion 100 inflates after the lateral peripheries of the interior of the airbag cushion 100.

As those having ordinary skill in the art will appreciate, a variety of alternatives are possible. For example, the diffuser panel may be attached to the bottom panel of the airbag cushion along the entire periphery of the diffuser panel, or along any other subset of the periphery of the diffuser panel as desired. In addition, the diffuser panel itself may only consist of a single layer of material that is attached directly to the interior of one of the airbag cushion panels over the inflator opening. As yet another alternative, the diffuser panel may form a substantially V-shaped configuration instead of the U-shaped configuration shown in the drawings. In such embodiments, the diffuser panel may be positioned in the airbag cushion such that the base of the "V" is positioned over the inflator opening. All of the foregoing diffuser panels are examples of means for redirecting inflation gas towards the top corners of the interior of an airbag cushion.

Figure 3A:
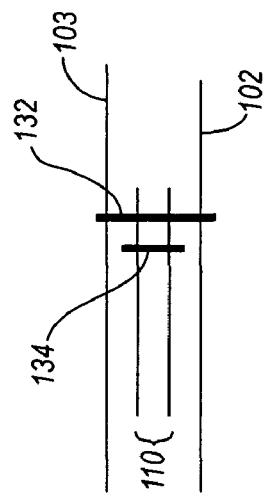
FIG. 3A is a cross-sectional view taken along line 3A-3A in FIG. 2.
Figure 3B:
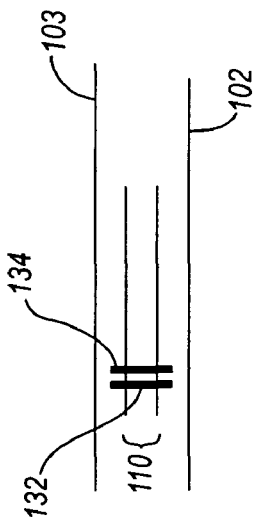
FIG. 3B is a cross-sectional view taken along line 3B-3B in FIG. 2.
Figure 2:
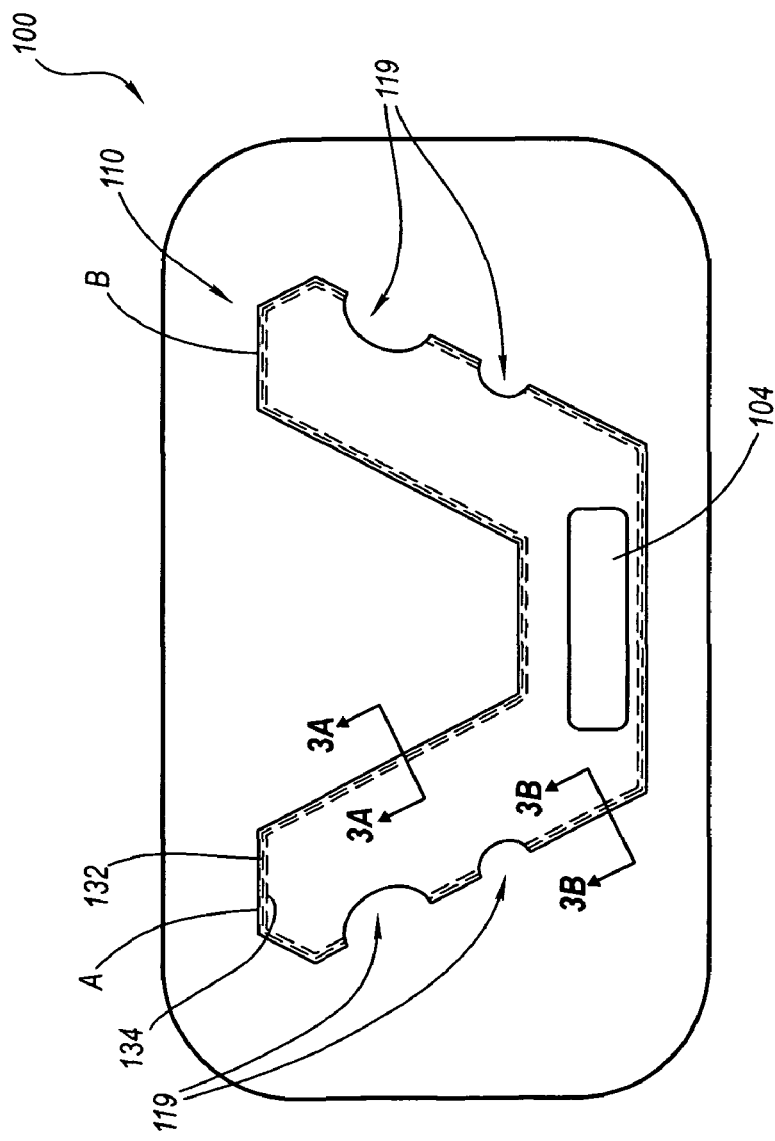
FIG. 2 is a top plan view showing the attachment patterns relative to the diffuser panel and airbag cushion panels.

FIGS. 2 and 3A-3B illustrate the sewing patterns of the embodiment shown in FIG. 1. As can be seen from these figures, there are two sew lines, sew line 132 and sew line 134, used to attach the two layers of diffuser panel 110. One or both of these sew lines, or one or more portions of one or both sew lines, may be a sacrificial sew line configured to break away after being subjected to a certain amount of force. For example, portions corresponding to the vent openings in the depicted embodiments may comprise sacrificial sew lines such that they break open upon deployment of the inflator. From point A to point B in FIG. 2, sew line 132 extends through all four layers—i.e., the two panel layers (lower panel 102 and upper panel 103) making up the airbag cushion 100 and the two layers making up diffuser panel 110—as shown in FIG. 3A. Sew lines 132 and 134, on the other hand, only extend through the two layers of diffuser panel 110, as shown in FIG. 3B. Of course, again, many variations are possible. Only a single sew line or a greater number of sew lines may be used, for example. As another alternative, one or more of the sew lines could extend through three of the four layers. As still another alternative, the sew line extending through to one or both of the airbag cushion layers may be positioned along other portions of the diffuser panel as desired. Of course, the portion or portions, if any, at which a sew extends through all four (or three) layers may vary as well.

The diffuser panel and sewing patterns of the depicted embodiment allow the inflation gas to be redirected to the lateral peripheries of the interior of the airbag cushion. In this embodiment, this is accomplished in at least two ways. First, inflation gas is redirected to the lateral peripheries of the interior of the airbag cushion 100 by directing inflation gas to locations within the region defined by the diffuser panel 110. In other words, inflation gas is directed to the lateral peripheries of the interior of the airbag cushion from within channels 112 and 114. Second, inflation gas is redirected to the lateral peripheries of the interior of the airbag cushion 100 by directing inflation gas outside of the region defined by the diffuser panel—i.e., outside of channels 112 and 114—via vent openings 119. The vent openings described herein are one example of venting means for venting inflation gas to the sides of the interior of the airbag cushion.

Figure 4:
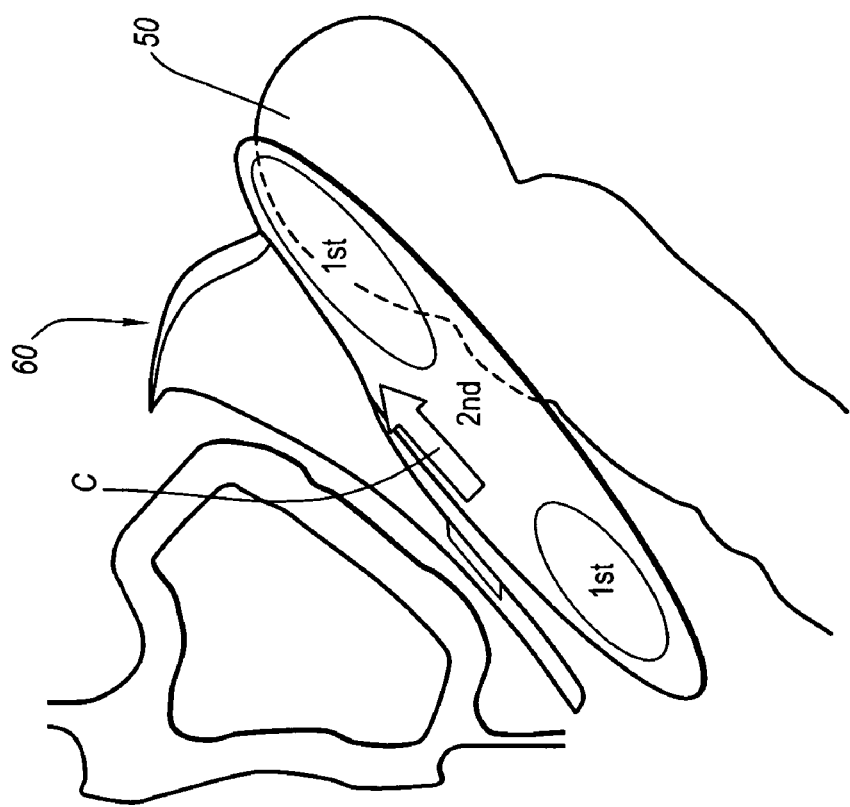
FIG. 4 is a cross-sectional view illustrating the inflation pattern of an embodiment of the invention.
Figure 5:
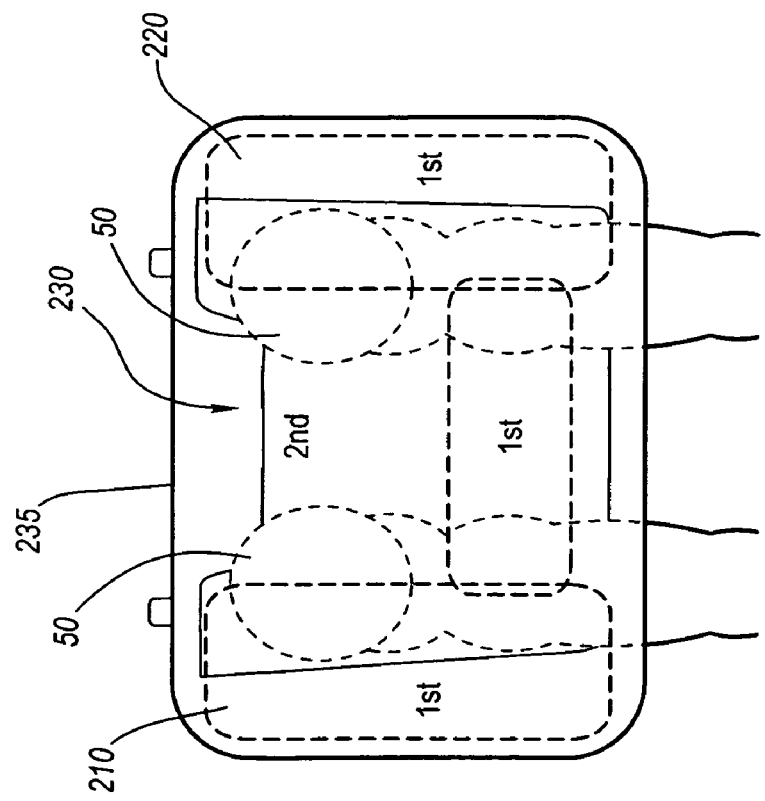
FIG. 5 is an elevation view further illustrating the inflation pattern of an embodiment of the invention.

FIGS. 4 and 5 illustrate the inflation sequence and initial inflation thrust of the embodiment described above. As can be seen from these figures, the lateral peripheries of the interior of the airbag cushion 100 inflate first, including region 210 and region 220. Regions 210 and 220 provide immediate protection to an occupant's knees 50. Also, the initial upward thrust of airbag cushion 100, represented by arrow C in FIG. 4, allows the cushion to promptly achieve proper positioning in the gap between the occupant's knees 50 and the instrument panel 60. The inflation of the lateral peripheries of the interior of the airbag cushion 100 first leaves a central region 230 of the interior of the airbag cushion to inflate after the lateral peripheries of the interior of the airbag cushion 100. In the depicted embodiment, the central region 230 extends up to the upper-central periphery 235 of the interior of the airbag cushion 100.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. An airbag cushion designed for protecting an occupant knee regions, comprising:
   a front face;
   a rear face having an inflator opening, wherein the front and rear faces define an interior of the airbag cushion having a single chamber with a central region and lateral peripheries; and
   a diffuser panel positioned over the inflator opening and in between the front and rear faces,
      wherein the diffuser panel defines a plurality of connected, elongated channels extending diagonally at an angle relative to each other,
      wherein the channels are positioned and configured to receive inflation gas from an inflator via the inflator opening,
      wherein the channels each have a vent opening directed toward one of the lateral peripheries, and wherein the vent openings are positioned diagonally and laterally with respect to the inflator opening,
      wherein the channels contain the inflation gas as the inflation gas is transmitted from the inflator opening within the channels to the vent openings in the channels and to deliver the inflation gas out of the channels via the vent openings to the lateral peripheries of the interior of the airbag cushion,
      wherein at least two of the plurality of connected, elongated channels have sacrificial sew lines that break open upon deployment of the inflator,
      whereby the lateral peripheries inflate to provide immediate protection to occupant knee regions upon impact followed by inflation of the remainder of the single chamber such that the central region of the interior of the airbag cushion inflates after the lateral peripheries of the interior of the airbag cushion and such that the lateral peripheries remain inflated after the central region becomes inflated.

2. The airbag cushion of claim 1, wherein the central region extends up to an upper-central periphery of the interior of the airbag cushion.

3. The airbag cushion of claim 1, wherein the diffuser panel comprises a single piece of material.

4. The airbag cushion of claim 1, wherein the diffuser panel comprises a plurality of pieces of material attached to one another.

5. The airbag cushion of claim 1, wherein the diffuser panel comprises a piece of material attached at opposing sides to one of the faces to provide inflation gas with a passageway, which is defined by the piece of material and the face to which is attached.

6. The airbag cushion of claim 1, wherein the airbag cushion has two top corners, and wherein the central region of the interior of the airbag cushion inflates after the top corners of the airbag cushion.

7. An airbag cushion designed for protecting an occupant knee regions, comprising:
   a front face;
   a rear face having an inflator opening,
      wherein the front and rear faces define an interior of the airbag cushion having a single chamber with a central region and opposing first and second lateral peripheries that respectively terminate at first and second top corners; and
   a diffuser panel between the front and rear faces,
      wherein the diffuser panel comprises a first elongated channel portion extending over the inflator opening, a second elongated channel portion extending diagonally at an angle from a first end of the first elongated channel portion toward the first top corner, and a third elongated channel portion extending diagonally at an angle from a second end of the first elongated channel portion toward the second top corner, wherein the second elongated channel and the third elongated channel each have a vent opening directed toward one of the lateral peripheries, and wherein the vent openings are positioned diagonally and laterally with respect to the inflator opening, wherein, upon inflation of the airbag cushion, inflation gas is received by the first channel from an inflator through the inflator opening, is contained by the first channel as the inflation gas is transmitted to the second and third channels, is contained within the second and third channels as the inflation gas is transmitted through the second and third channels to their respective vent openings, and is delivered via the vent openings, such that the inflation gas is directed towards the lateral peripheries of the interior of the airbag cushion, whereby the lateral peripheries inflate to provide immediate protection to occupant knee regions upon impact, the central region of the interior of the airbag cushion inflates after the lateral peripheries, and the lateral peripheries remain inflated after the central region becomes inflated.

8. The airbag cushion of claim 7, wherein the second elongated channel and the third elongated channel each have sacrificial sew lines that break open upon deployment of an inflator.

9. The airbag cushion of claim 7, wherein the diffuser panel comprises a single piece of material.

10. The airbag cushion of claim 7, wherein the diffuser panel comprises a plurality of pieces of material attached to each other.

11. The airbag cushion of claim 7, wherein the diffuser panel comprises a piece of material attached at opposing sides to one of the faces to provide inflation gas with a passageway, which is defined by the piece of material and the face to which is attached.

12. The airbag cushion of claim 7, wherein the central region of the interior of the airbag cushion inflates after the top corners of the airbag cushion.

* * * * *